(12) United States Patent
Stadler et al.

(10) Patent No.: US 11,587,187 B2
(45) Date of Patent: Feb. 21, 2023

(54) ROBUST AND FAST DESIGN OF ENERGY SYSTEMS CONSIDERING INTRA-HOUR VARIABILITY

(71) Applicant: Xendee Corporation, San Diego, CA (US)

(72) Inventors: Michael Stadler, San Diego, CA (US); Patrick James Mathiesen, Minneapolis, MN (US); Zachary K. Pecenak, San Diego, CA (US)

(73) Assignee: Xendee Corporation, San Diego, CA (US)

( * ) Notice: Subject to any disclaimer, the term of this patent is extended or adjusted under 35 U.S.C. 154(b) by 0 days.

(21) Appl. No.: 17/676,026

(22) Filed: Feb. 18, 2022

(65) Prior Publication Data
US 2022/0270187 A1 Aug. 25, 2022

Related U.S. Application Data

(60) Provisional application No. 63/151,590, filed on Feb. 19, 2021.

(51) Int. Cl.
*G06Q 50/06* (2012.01)
*G06Q 10/04* (2012.01)

(52) U.S. Cl.
CPC ............. *G06Q 50/06* (2013.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 2012/0144828 A1* | 6/2012 | Lazaris | ................... | H02J 3/381 60/641.1 |
| 2012/0239453 A1* | 9/2012 | Osogami | ................ | G06Q 10/04 705/7.25 |
| 2013/0213038 A1* | 8/2013 | Lazaris | ................... | H02J 3/382 60/641.1 |
| 2013/0218355 A1* | 8/2013 | Lazaris | ............. | H02J 13/00002 706/15 |
| 2013/0218548 A1* | 8/2013 | Lazaris | ................... | G06Q 50/06 703/18 |

(Continued)

OTHER PUBLICATIONS

Farhadkhani, Mehdi, "Energy Scheduling in Power Market under Stochastic Dependence Structure," IEEE, 2015, 6pg. (Year: 2015).*

(Continued)

*Primary Examiner* — Ryan D. Coyer
(74) *Attorney, Agent, or Firm* — Fish & Richardson P.C.

(57) ABSTRACT

The disclosed embodiments combine an energy balance (e.g., averaged energy profiles) with original time series data having smaller time steps to establish an energy balance (e.g., averaged profiles) and a power balance (e.g., smaller time step with original time series data) for a Distributed Energy Resources (DER), microgrid, or other energy system. In an embodiment, a method comprises: solving, with at least one processor, a first optimization problem on time series data related to energy system planning, the first optimization including applying a power balancing framework to the time series data that captures intra-hour variability; and selecting, with the at least one processor, technology assets and sizing for the energy system based on an average hourly and sub-hourly datasets.

20 Claims, 9 Drawing Sheets

(56) References Cited

U.S. PATENT DOCUMENTS

| | | | | |
|---|---|---|---|---|
| 2016/0306373 | A1* | 10/2016 | Mashima | G05B 15/02 |
| 2018/0233922 | A1* | 8/2018 | Sun | G05B 15/02 |
| 2018/0254632 | A1 | 9/2018 | Elbsat et al. | |
| 2020/0350762 | A1* | 11/2020 | Holzer | H02J 3/0012 |
| 2020/0373759 | A1 | 11/2020 | Samaan et al. | |
| 2021/0334911 | A1* | 10/2021 | Feng | H02J 3/466 |
| 2021/0342404 | A1* | 11/2021 | Wade | G06V 30/224 |

OTHER PUBLICATIONS

Goez et al., IBM Research Report RC24713 (W0812-119), IBM, 2008, 10pg. (Year: 2008).*
Tumuluru et al., "Unit commitment problem: A new formulation and solution method," Elsevier, 2013, 10pg. (Year: 2013).*
Zhou et al., "Stochastic Methods Applied to Power System Operations with Renewable Energy: A Review," Argonne National Laboratory, 2016, 73pg. (Year: 2016).*
Hoffmann et al., "A Review on Time Series Aggregation Methods for Energy System Models," MDPI, 2020, 61pg. (Year: 2020).*
International Search Report and Written Opinion in International Appln. No. PCT/US2022/017096, dated Jun. 14, 2022, 11 pages.
Qin et al., "Quantification of intra-hour security-constrained flexibility region," IEEE Transactions on Sustainable Energy, Oct. 2016, 8(2): 13 pages.

* cited by examiner

Traditional approach / Benchmark

Run full scale optimization (FSO) problem with original time-series data (e.g. 5 min). Sizing and dispatch based on original dataset and each time-step is explicitly considered in the energy balance.

Results:
- DER power capacity sizing
- Optimized dispatch based on original time-series

FIG. 2

ROBUST AND FAST DESIGN OF ENERGY SYSTEMS CONSIDERING INTRA-HOUR VARIABILITY

CROSS-RELATED APPLICATION

This application claims the benefit of U.S. Provisional Patent Application No. 63/151,590, filed on Feb. 19, 2021, for "Robust and Fast Techno-Economic Distributed Energy Resources (DER) Sizing in Energy Generation and Microgrids Considering Intra-Hour Variability," which provisional patent application is incorporated by reference herein in its entirety.

TECHNICAL FIELD

The subject matter of this application relates generally to energy generation and usage modelling in cloud computing and computer information systems applications.

BACKGROUND

Planning methodologies (e.g., simulation tools, mixed integer optimization methodologies) for DER projects rely on data reduction methods to reduce computer runtimes for practical engineering and design processes. The process of data reduction for time series data, such as solar radiation or load profile data (e.g., electricity usage or heating), typically delivers averaged data in 60, 30, or 15 min time steps. The original time series data, however, is typically provided at smaller time steps (e.g., 5 min, 1 min, or even smaller). The averaging of the original time series data into a 60 min, 30 min or 15 min time steps eliminates spikes (e.g., power spikes) and creates a smoother profile at the expense of a loss of information (e.g., missed power spikes) and time granularity. The averaged profile can be used for sizing of energy system technologies regarding their energy output (e.g., averaged output over a 60 min period), but fail to deliver reliable sizing numbers for volatile energy systems involving, e.g., photovoltaic (PV), wind, or isolated conditions without any utility connection.

Accordingly, there is a need for a robust, reliable, and fast (from a computational stand-point) methodology to capture the smaller time steps of the original data in planning the design of DER, microgrid and other energy systems.

DESCRIPTION OF DRAWINGS

FIG. 2 is a flow diagram illustrating a traditional full-scale optimization (FSO) process.

SUMMARY

Figure 1:
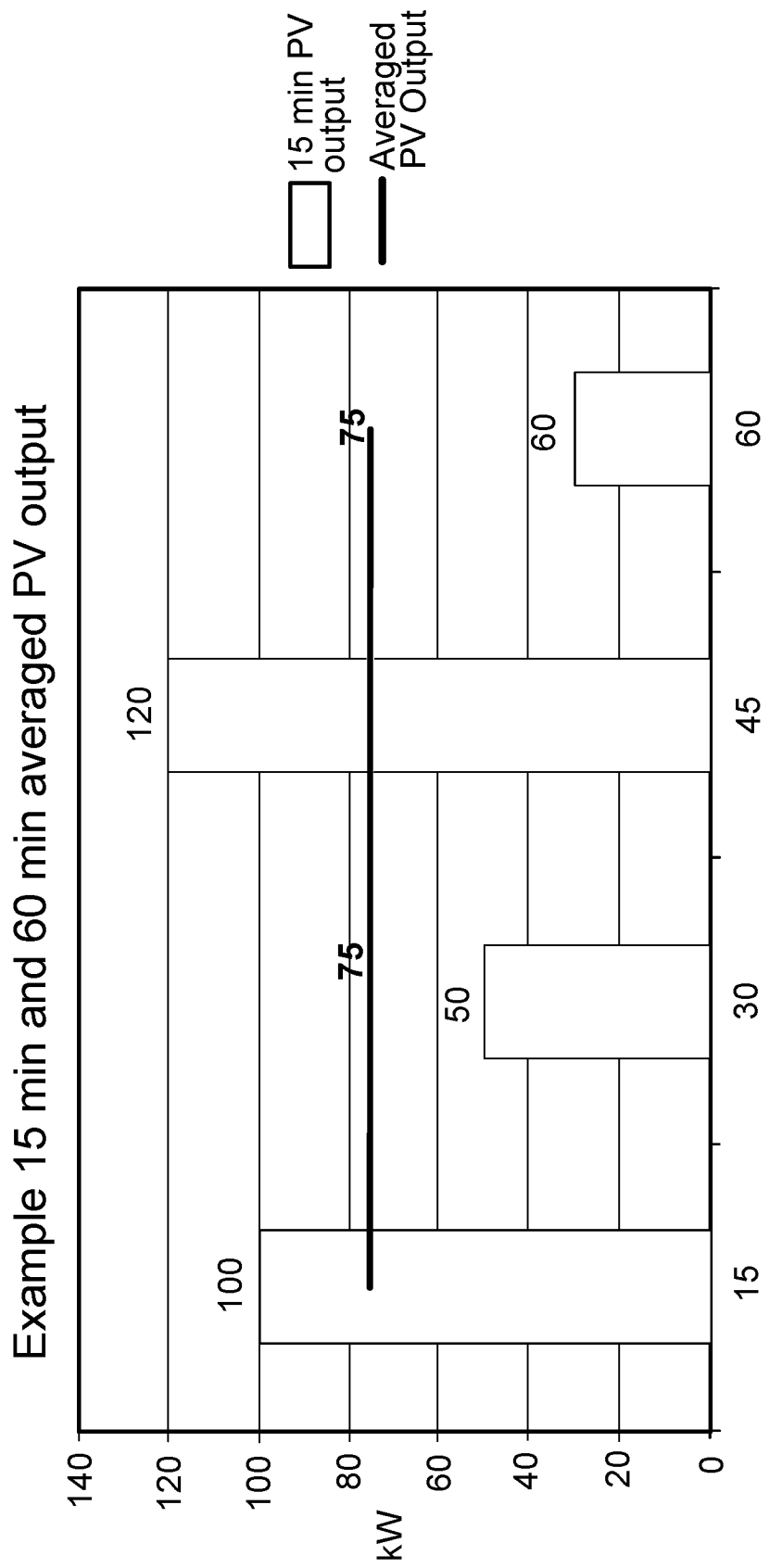
FIG. 1 is a bar graph illustrating a basic averaging problem that occurs when reducing (e.g., averaging) time series data.

The disclosed embodiments combine an energy balance (e.g., averaged energy profiles) with original time series data having smaller time steps to establish an energy balance (e.g., averaged profiles) and a power balance (e.g., smaller time step with original time series data) for a DER, microgrid, or other energy system. The disclosed embodiments can be performed with a simulation tool, a mathematical optimization tool or any other rule-based process that ensures that energy supply equals energy demand at each time step in the averaged and original (more granular) time series data.

In an embodiment, a method comprises: solving, with at least one processor, a first optimization problem on time series data related to energy system planning, the first optimization including applying a power balancing framework to the time series data that captures intra-hour variability; and selecting, with the at least one processor, technology assets and sizing for the energy system based on an average hourly and sub-hourly datasets.

In an embodiment, the average hourly data is obtained by down-sampling the time series data.

In an embodiment, the first optimization generates energy technology capacity numbers.

In an embodiment, the method comprises: solving, with the at least one processor, a dispatch optimization problem on the original time series data; and outputting, with the at least one processor, the energy technology selection and sizing and a dispatch.

In an embodiment, the first and dispatch optimization problems are solved using mixed integer optimization methods.

In an embodiment, the mixed integer optimization methods solve energy technology sizing and dispatch by considering an objective function, energy balance and constraints.

In an embodiment, the constraints include available photovoltaic space, cost constraints and technology constraints.

In an embodiment, the energy balance is violated when an energy transfer failed to occur between timesteps in the down-sampled time series data.

In an embodiment, the first dispatch optimization problems are solved using simulation.

In an embodiment, the power balancing framework reduces intra-hour variability to a single intra-hour time step to decouple a power balance time scale from an energy balance time scale.

In an embodiment, the power balancing framework includes the following power balancing equations:

$$\sum_{T \in DER} B^e_{m,d,h,T} \geq \max_{j \in \tau} L_{m,d,h,j},$$

where the power balance $B^e_{m,d,h,T}$ is greater than or equal to a maximum power demand ($L_{m,d,h,j}$), where m is month, d is day, h is hour, T is the set of technologies producing power, j is an index for sub-hourly time steps and $\tau$ is the set of sub-hourly timesteps.

DETAILED DESCRIPTION

Solving sizing and dispatch problems for the reliable technical design of energy systems typically require extreme computer run times (e.g., on the order of a day), and in particular when the time steps of the original data (e.g. load profiles, solar data, wind data, etc.) are small. Smaller time steps (higher granularity), however, are needed for robust sizing of equipment (e.g., inverters, storage technologies or other generation technologies) to capture power spikes accurately and that may be missed by averaging data.

A traditional approach is to use rule-based dispatch for DER and microgrid technologies (e.g., combined heat and power), which are user specified, to reduce runtimes. In this way, the user anticipates a certain operational profile/dispatch. But this traditional approach has a major shortcoming since the operational levels (e.g., charging or discharging levels of electric storage systems) should be an outcome of an optimal design process. Accordingly, the best solution is to use mathematical optimization methodologies, which size energy, DER, and microgrid technologies in one holistic approach based on the most optimal operational schedules (referred to herein as "dispatch") and the most granular data available.

Microgrid, DER and other energy solutions often include a wide variety of technologies, including but not limited to: PV, electric storage, heat storage, cold storage, solar thermal, heat pumps (ground and air), electric vehicles, hydrogen and hydrogen storage, flow batteries, absorption and absorption chillers, centralized cooling and heating, internal combustion engines, gas turbines, micro-turbines, wind turbines, hydroelectric power, all kinds of fuel cells, combined heat and power, cooling technologies, demand response and efficiency measures, and any other suitable technologies.

Microgrid and DER solutions also have multiple energy carriers as input, including but not limited to: natural gas, hydrogen, biogas, methane, diesel, biomass, sun, wind, hydro and any other suitable energy carriers.

Microgrid and DER solutions are efficiency measures (e.g., building upgrades, window changes) to reduce the overall energy demand for heating, cooling, electricity (e.g., lighting or computing, and any other suitable efficiency measures.

Microgrids and DER solutions are demand response measures to shift, reduce or cut power demand (e.g., electricity or heating).

To evaluate the attractiveness of a particular project in terms of annualized investment costs sophisticated mathematical models are needed. Examples of investment costs include but are not limited to: net present value, levelized cost of energy (LCOE), internal rate of return, capital expenditure (CAPEX), operating expense (OPEX), efficiency, environmental impact such as $CO_2$ emissions, NOx emissions or CO emissions. Such mathematical models can use simulation or optimization techniques. Such models need to combine the characteristics of the technologies (e.g., specific investment costs as $/kW or $/kWh, electrical and thermal efficiency, charging and discharging efficiencies, minimum state of the charge, maintenance costs) with load profiles for different end uses (e.g., electric, heating, domestic hot water, cooling, natural gas, process heat in the industry), energy prices, tariffs and environmental constraints (e.g. available space for photovoltaics).

Based on available information and other assumptions and data (e.g., solar radiation or wind data), the simulation and/or optimization techniques calculate an optimal technology mix, costs, CAPEX, OPEX, optimal operational level (e.g. output of electric storage system in each time-step) and an environmental impact for the sites, places, buildings, or geographic regions under consideration.

As previously stated, the conventional approach is to use averaged time-series data with 60, 30, or 15 min time-steps to reduce run-time and provide energy balances and sizing of DER, microgrid, and other energy technologies on a kWh basis. However, this approach fails to size power energy technology (e.g., inverters, generators and other equipment) correctly, especially in high volatile situations without any utility grid connection.

Accordingly, a reliable system and method is needed to capture power spikes occurring at smaller time-steps (e.g., 5 mins or min) which is also computational effective. The embodiments disclosed below apply to any time-scale and averaging time scale. The embodiments described below apply to electrical, thermal, cooling, heating, industrial load profiles, solar and wind data, and any other time-series data needed for energy system, DER, and microgrid planning in computational systems, cloud computing, and computer information systems applications.

Problem Statement

FIG. 1 is a bar graph illustrating a basic averaging problem that occurs when reducing (e.g., averaging) time series data. In the example shown, a PV system is assumed that should provide output on a 15 min basis, such that the modelling and data reduction averages four 15 min data points into one hour. The result is a constant 75 kW output for a full hour (60 min). However, the original 15 min outputs can vary between 30 and 120 kW, as shown in FIG. 1. From an energy perspective the "original" and "averaged" data deliver the same amount of power. For example: 15 min data delivers 100 kW×0.25 h+50 kW×0.25 h+120 kW×0.25 h+30 kW×0.25 h=75 kW, and 60 min data delivers 75 kW×1 h=75 kWh. If the power rating of the associated PV inverter is designed based on the averaged 60 min data, the result is 75 kW. The "original" 15 min data however requires a 120 kW PV inverter to capture the generation level at time-step 45 min.

Thus, designing a PV inverter based on the averaged power output of 75 kW results in a power shortcoming of 45 kW. The example PV system that is designed based on the averaged 60 min data cannot provide (100-75) kW×0.25 h+(120-75) kW×0.25 h=17.5 kWh. Note that first and third bar in FIG. 1 are higher than the average of 75 kW. Accordingly, the system is incorrectly sized based on averaged data.

FIG. 2 is a flow diagram illustrating a traditional full-scale optimization (FSO) process. A FSO serves as a conventional benchmark approach. FSO solves the optimization on a full set of time-steps at the timescale of interest. As such, intra-hour variability is inherently considered when the time-step size is small. FSO is a single step optimization, such that investments and dispatch decisions are optimized simultaneously. Therefore, computer runtime is expected to be high, especially for high resolutions in which many decisions (e.g., battery charge/discharge) are to be made for each time step.

Figure 3:
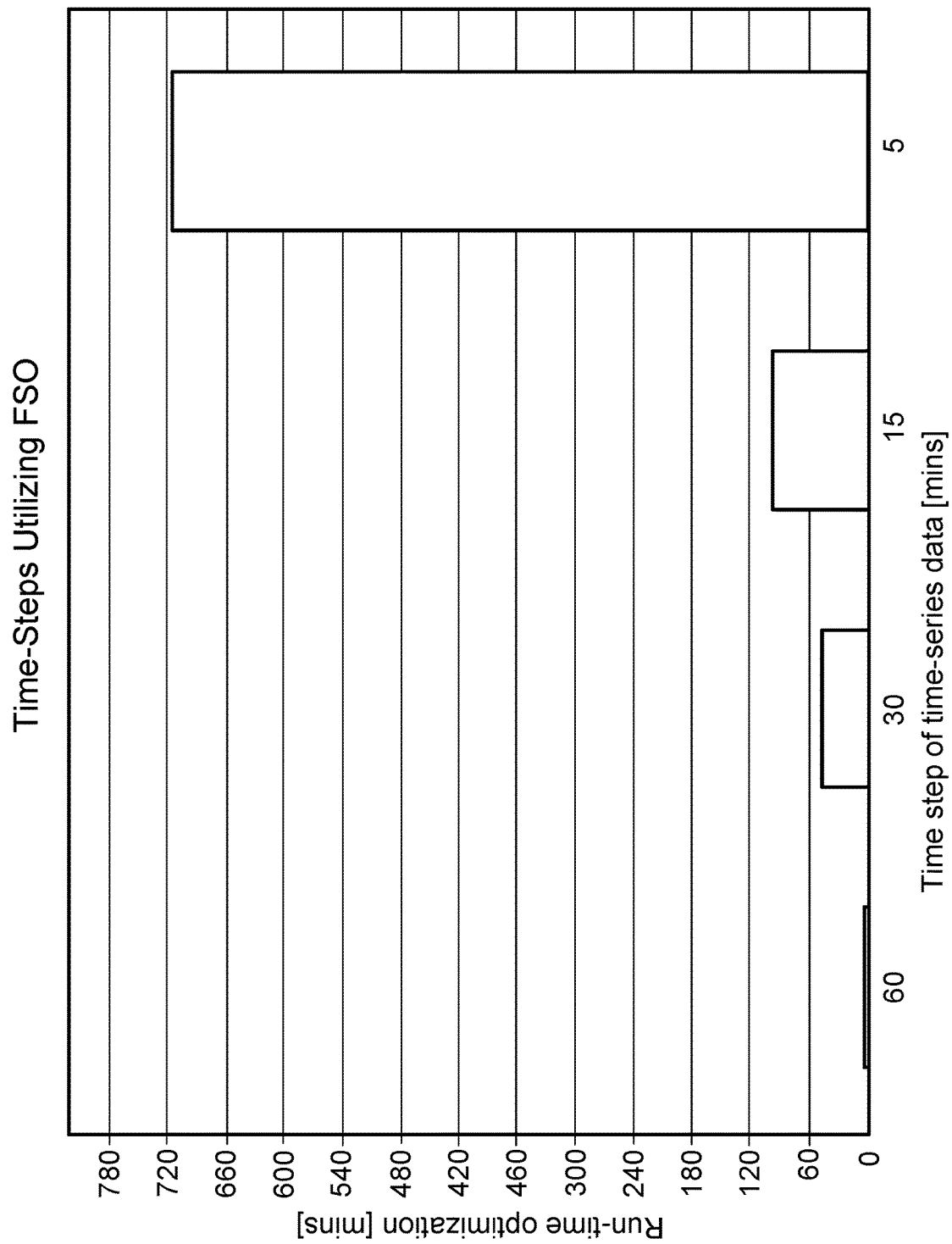
FIG. 3 is a bar graph illustrating computer runtimes for an energy system.

FIG. 3 is a bar graph illustrating software run-times for an energy system considering. In the example shown, an example optimization run-time for time-series data with different time-steps utilizing FSO. In this example, the run-time optimization (e.g., about 720 minutes) is high for 5 minute data resolution where many optimization decisions are made.

Example Multi-Step Planning System with Intra-Hour Variability

Figure 4A:
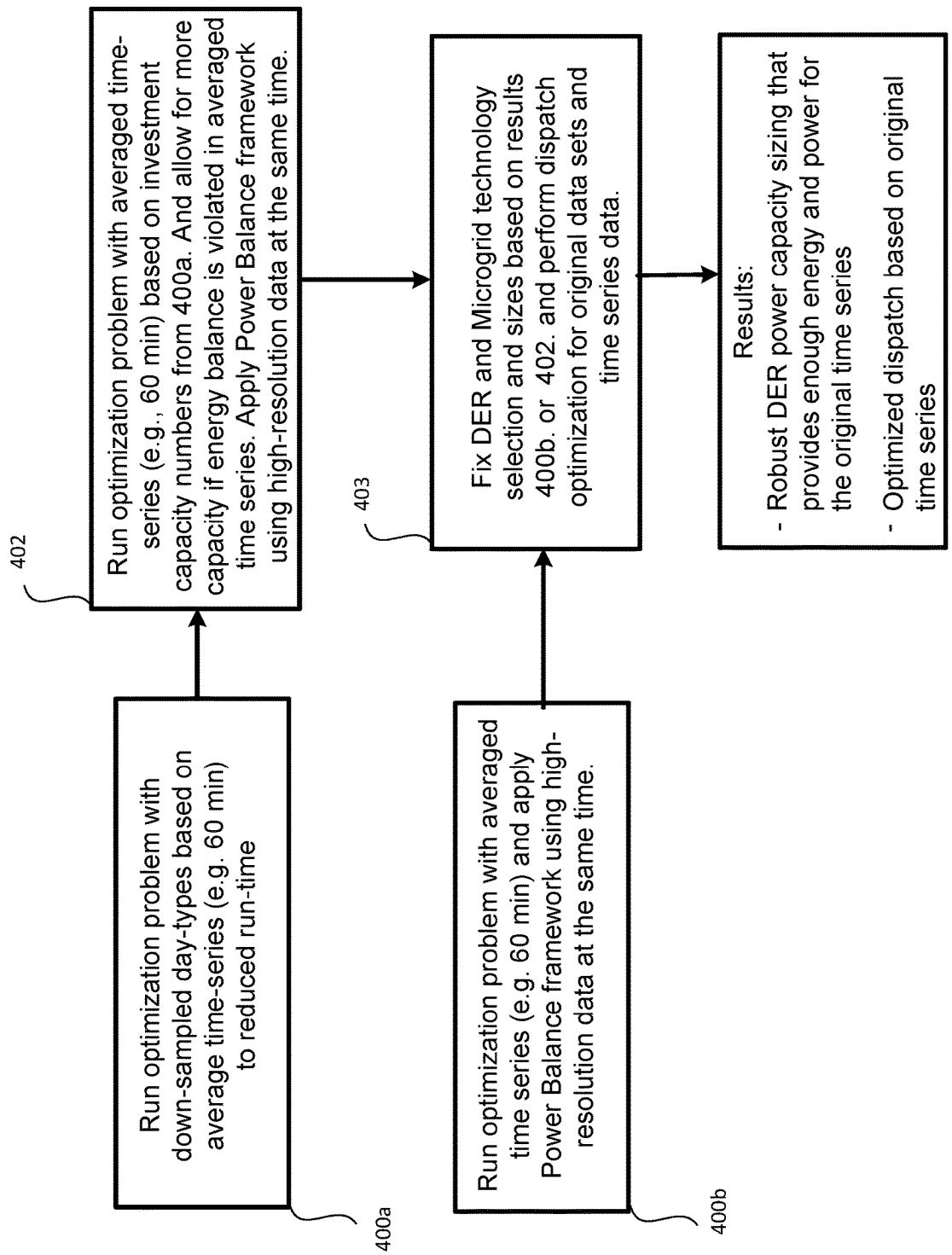
FIG. 4A is a flow diagram of a multistep process to achieve robust and fast sizing of energy systems considering intra-hour variability, according to an embodiment.

FIG. 4A is a flow diagram of a multistep process 400 to achieve robust and fast techno-economic sizing in energy generation, DER, microgrids and other energy systems while considering intra-hour variability using power balance equations, according to an embodiment. Process 400 assumes a mixed integer linear optimization problem that solves for energy system sizing and dispatch by considering an objective function (e.g. costs, $CO_2$ emissions, max reliability, max renewable output, etc.), energy balance, as well as constraints. Other optimization formulations are also applicable. The energy balance ensures that demand equals supply at each time step. Constraints on the optimization problem can include but are not limited to: available PV space, cost constraints and technology constraints (e.g., electric storage maximum charging rates, generation efficiencies, etc.).

There are two possible starting steps 400a, 400b for process 400. At step 400a, the original data set is down-sampled. For example, the original data set (e.g., for electric loads) can be down-sampled by averaging the original time series data into daily profiles for week-days, weekend-days and peak-days. Other, down-sampling approaches can also be used. Instead of using FSO, step 400a uses a subset of typical days (e.g., 36 typical days). The time resolution of the subset of typical days can be based on the original data set time steps (e.g., 5 mins) or averaged into 60 mins or other suitable time steps. Step 400a then solves a first optimization problem that delivers optimal invested capacity numbers and dispatches based on the subset of typical days.

At step 402, process 400 captures seasonal or multi-day effects (e.g., energy transfer between days). Power balance constraints are not applied in step 402, but are applied later in process 400, as described below. Step 402 incorporates the invested capacity numbers generated in step 400a to solve a second optimization problem and determine if the energy balance is violated. For example, the energy balance can be violated if the time-linked averaged time series data requires up sizing due to energy transfer between days. If the energy balance is violated, the invested capacity numbers can be optimally increased. Importantly, step 402 uses less granular data (e.g., 60 min) than the original data set to reduce computer runtime.

At step 402, a power balancer equation is simultaneously used to create a robust solution for the original data at the smaller time-steps of the original data set. For example, the power balancer equations can be used to increase the power equipment invested capacity numbers generated (e.g., adjust the size of inverters) to accommodate for power spikes not captured in the down-sampled (e.g., averaged) time series data alone. In an embodiment, the power balancer constraints in the optimization operate on a single worst-case variability event of the intra-time-step period to allow for high-resolution power spikes to be considered without increasing the time dimension of the optimization. Other constraints may also be used.

In an embodiment, process 400 can also start at step 400b without down-sampling and solve a third optimization problem, which uses a power balancer equation directly. This is equivalent to the process in step 402, however an initial solution is not given to upsize from. Thus, step 400b can result in longer runtimes than the combination of steps 400a and 402. However, challenges introduced by the down-sampling process in step 400a (e.g., incorrect oversizing) can be avoided by starting at step 400b.

Since step 402 or step 400b does not provide a dispatch solution for the original non-averaged time-step size, dispatch profiles for the up-sized and correctly sized equipment capacities are provided by fixing the invested capacity numbers from step 402 and performing a dispatch optimization. This decoupling of sizing and dispatch significantly reduces run-times. In an embodiment, step 403 can be omitted if the user is not interested in dispatch for the original data (e.g., if they are only interested in the sizing outcome).

Process 400 described above is a multi-step approach and, depending on the starting step 400a or 400b, includes 3 or 2 steps, respectively, and reduces runtimes by orders of magnitude. Process 400 links energy balance with power balance. An example energy balance equation to be optimized is given by Equation [1] (in kW units):

$$\Sigma_{T \in technologies} E_{m,d,h,j,T} + U_{m,d,h,j} = + \Delta t \cdot (L_{m,d,h,j} - C_{m,d,h,j} + N_{m,d,h,j}). \quad [1]$$

Equation [1] states that for each month (m), day (d), hour (h) and sub-hourly time-step (j), the sum of energy ($E_{m,d,h,j,T}$) and utility energy purchases ($U_{m,d,h,j}$) produced or consumed across the set of technologies T equals the energy exported to the energy system ($X_{m,d,h,j}$) plus the sum of power demand ($L_{m,d,h,j}$), minus the load curtailment ($C_{m,d,h,j}$), plus net demand adjustment from load shifting ($N_{m,d,h,j}$), multiplied by the model time-step ($\Delta t$). Equation [1] is generally applicable to any model resolution. The sub-hourly index j, varies with the model resolution. For example, j={1} for $\Delta t=1$ h and j={1,2, ..., 12} for $\Delta t=5$ min (0.083 hr). Thus, Equation [1] is directly considered in the benchmark FSO at the given data granularity (e.g., 5 min). Because of the high granularity this leads to high run times as shown in FIG. 3.

Equation [1] can be extended to other energy services as heating, cooling, among others. To reduce run-time, the energy balance from Equation [1] can be used with averaged data (e.g. 60 min data) to remove index j and the basic averaging problems described in reference to FIG. 1.

To address intra-hour variability, a power balancer equation is introduced to ensure that sufficient DER, microgrid or other energy system technology capacity is available to meet certain conditions. A power balancer equation is not used in the traditional FSO benchmark. An example power balancer equation that can be applied in steps 402 or 403 of process 400 is given by Equation [2] (in kW units):

$$\sum_{T \in DER} B^e_{m,d,h,T} \geq \max_{j \in \tau} L_{m,d,h,j}. \quad [2]$$

In Equation [2], worst-case variability conditions of the intra-hour are used. For example, Equation [2] states that there must be sufficient electric balancing power ($B^e_{m,d,h,T}$) across all energy technologies T to meet the maximum sub-hourly electric demand ($L_{m,d,h,j}$), where j is the sub-hourly timesteps (i.e. the original non-averaged data) and $\tau$ is a set of timesteps. By reducing intra-hour variability to a single intra-hour time-step, the power balance timescale ($\Delta \tau$) is decoupled from the energy balancer timescale ($\Delta t$). Thus, energy technology and DER sizing optimizations can be performed using lower-resolution timescales (e.g., hourly), while still considering high-resolution intra-hour variability. This contributes to computer runtime savings. Note that different definitions for the power balancer are possible depending on how much sub-hourly extreme events should be captured. Additionally, similar cost numbers (e.g., annual project costs) can be achieved with process 400 as shown in FIG. 3 compared to the benchmark process shown in FIG. 2.

Note that the underlying optimization problem embodied in steps 400a, 402 and 403 is the same, except that the data that is input into the optimization problem changes depending on whether step 400a or 400b is used. For example, Equations [1] and [2] are used in both cases, but if step 400a is used, then down-sampled time series data is used in the optimization which is not linked in time (e.g., typically 3 days per month). If step 400b is used, then slightly down-sampled data is used in the optimization problem, which is linked in time (e.g., typically hourly resolution for a whole year). For step 403, the full unsampled data is used in the optimization (e.g., typically 5-15 minute resolution for the whole year).

Figure 4B:
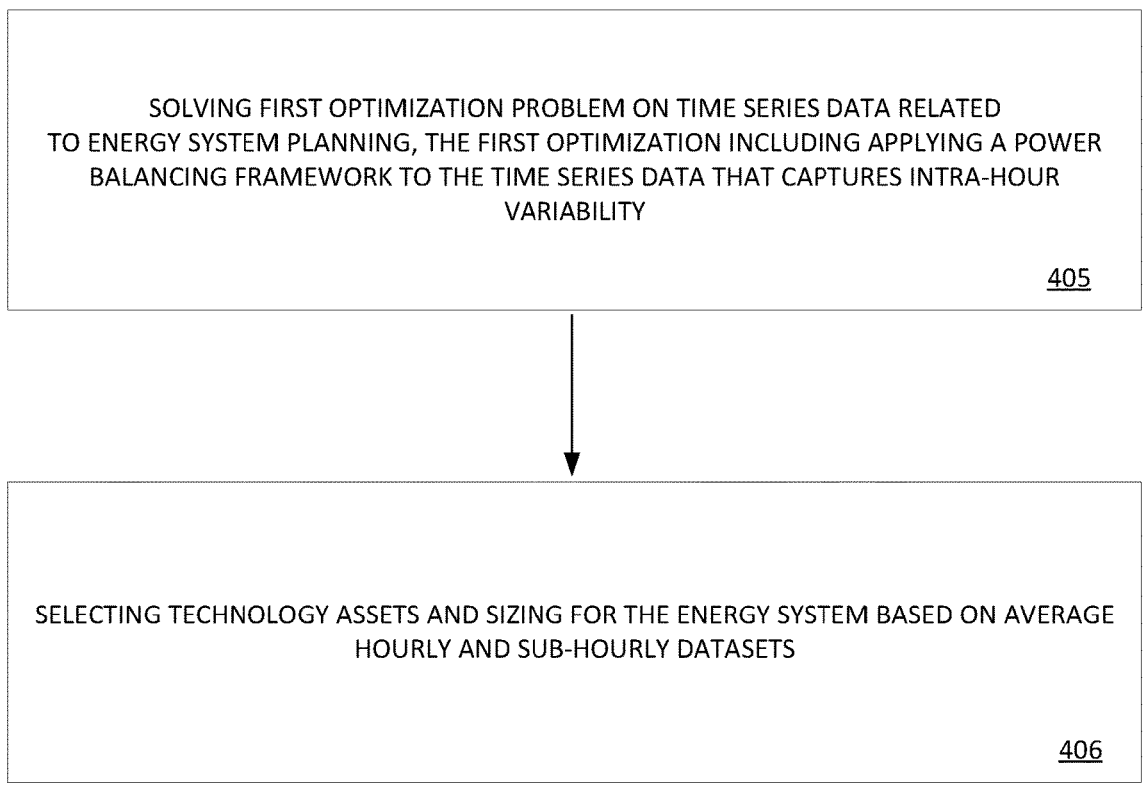
FIG. 4B is a flow diagram of the multistep process described in reference to FIG. 4A, according to an embodiment.

FIG. 4B is a flow diagram of the multistep process 404 described in reference to FIG. 4A, according to an embodiment. Process 404 can be implemented using, for example, the computer architecture described in reference to FIG. 7.

Process 404 includes the steps of solving a first optimization problem on time series data related to energy system planning, the first optimization including applying a power balancing framework to the time series data that captures intra-hour variability (405), and selecting technology assets and sizing for the energy system based on an average hourly and sub-hourly datasets (406). Each of these steps were described in more detail in reference to FIG. 4.

Figure 5:
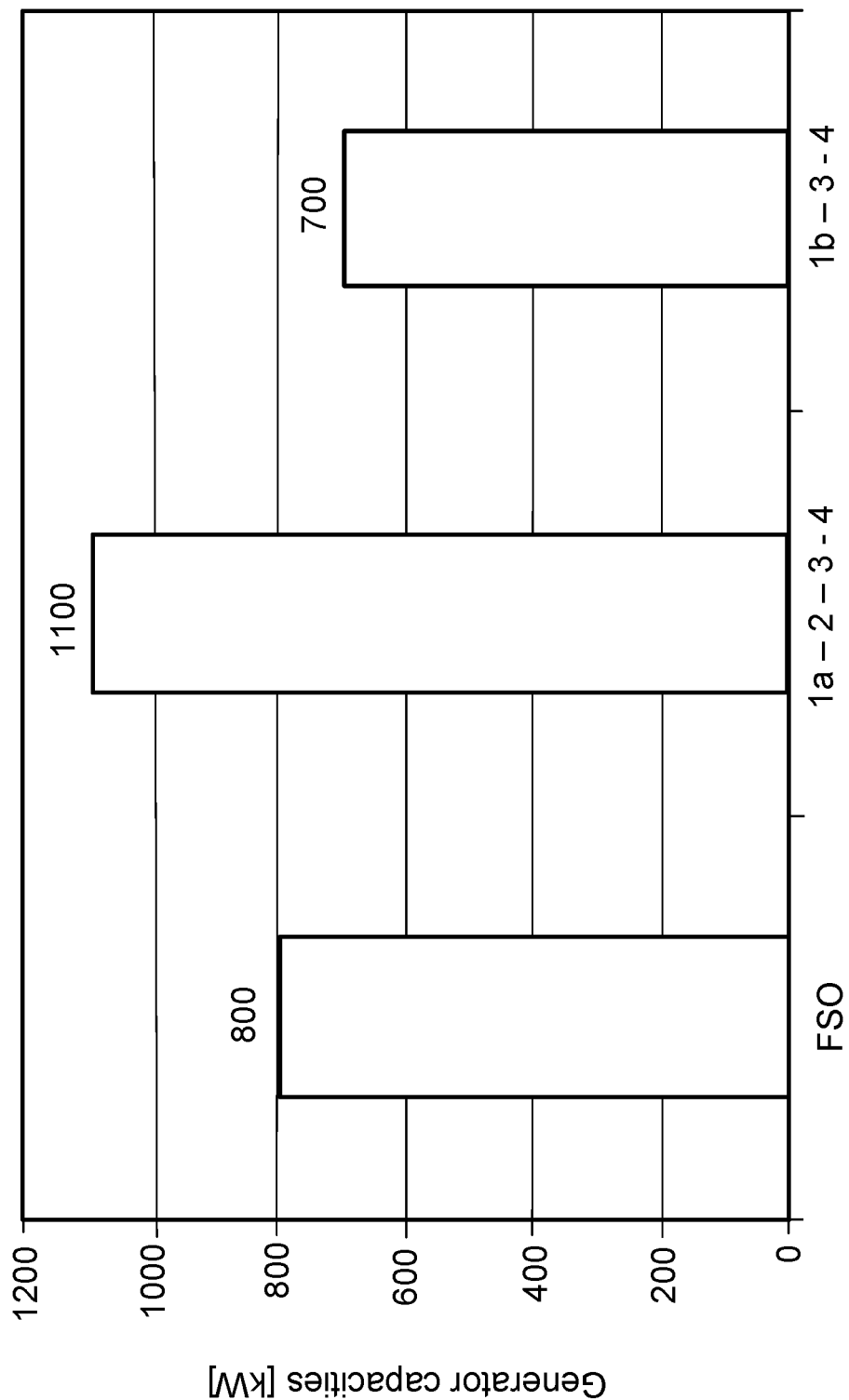
FIG. 5 is a bar graph illustrating an optimal generator capacity for a microgrid design involving PV and electric storage using 5 minute time resolution data, according to an embodiment.

FIG. 5 is a bar graph illustrating an example optimal generator capacity for a microgrid design involving PV and electric storage using 5 minute time resolution data and process 400 shown in FIG. 4, according to an embodiment. The benchmark approach is shown as FSO. Process 400 using down-sampled data is shown as process 400a. Process 400 starting without down-sampled data is shown as process 400b. It can be observed from FIG. 5 that process 400a can lead to some generator oversizing compared to the FSO benchmark. Process 400b can correct this oversizing, but in this example such correction may lead to slight under-sizing compared to the FSO benchmark.

Figure 6:
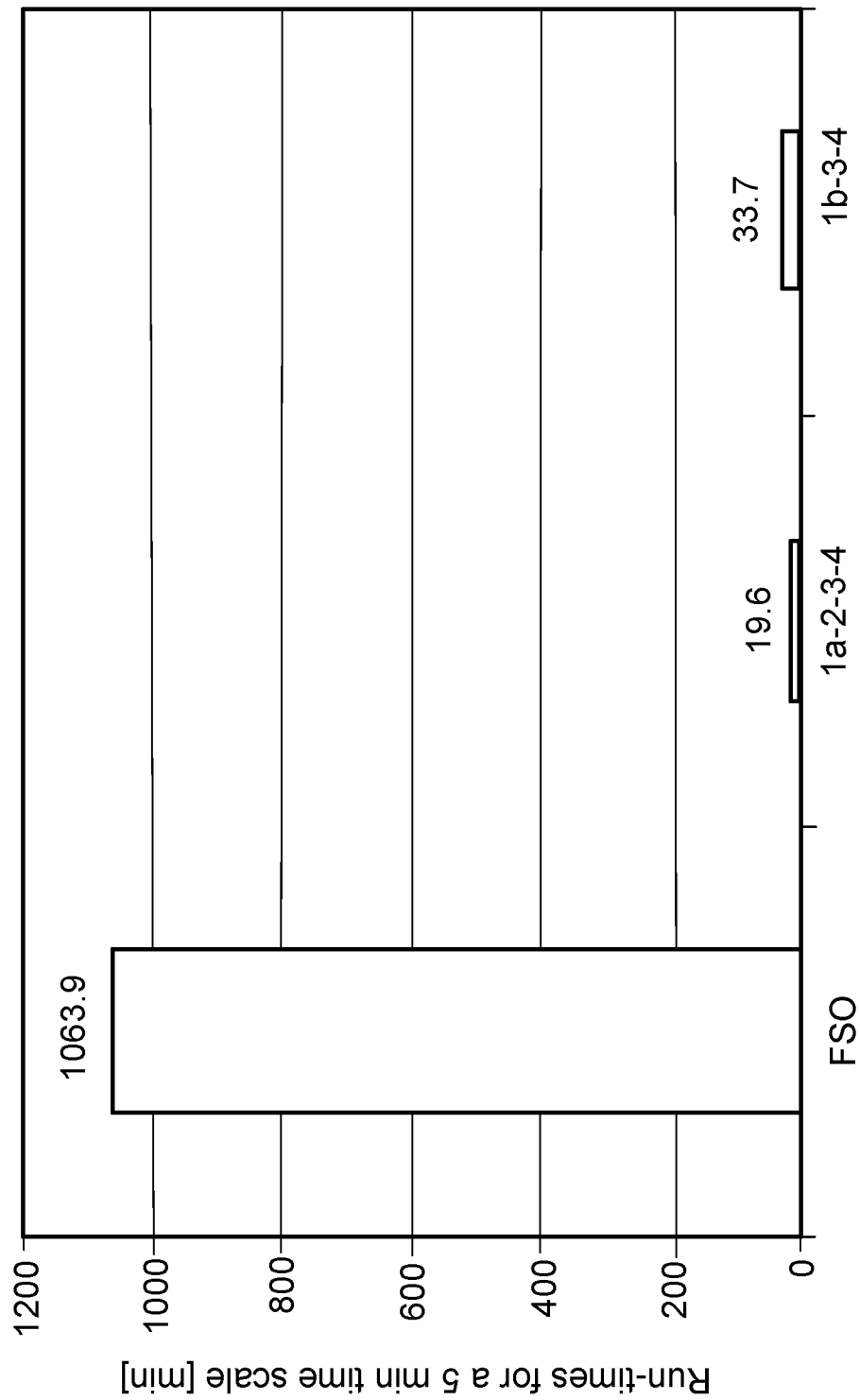
FIG. 6 is a bar graph showing a runtime for a microgrid design using 5 min time resolution data, according to an embodiment.

FIG. 6 is a bar graph showing a run-time for a microgrid design using 5 min time resolution data and process 400 shown in FIG. 4, according to an embodiment. The benchmark approach is shown as FSO. As shown in the bar graph, both alternative processes 400a, 400b provide runtime savings with slightly better runtimes for process 400a.

Figure 7:
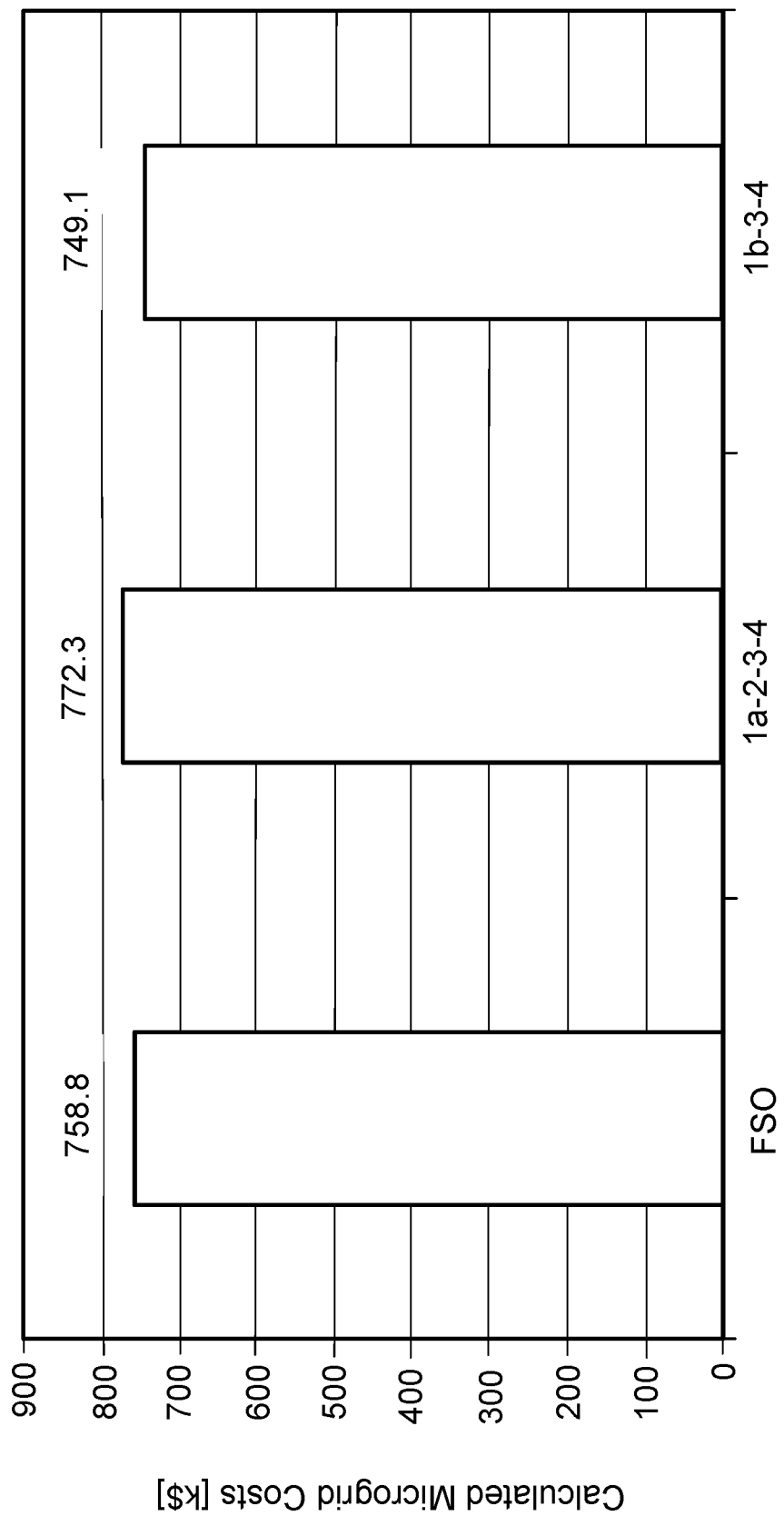
FIG. 7 is a bar graph showing annual costs for a microgrid design using 5 min time resolution data, according to an embodiment.

FIG. 7 is a bar graph showing annual costs for a microgrid design using 5 min time resolution data and process 400 shown in FIG. 4, according to an embodiment. The benchmark approach is shown as FSO. As shown, both alternative processes 400a, 400b show very similar costs than the benchmark FSO approach.

Figure 8:
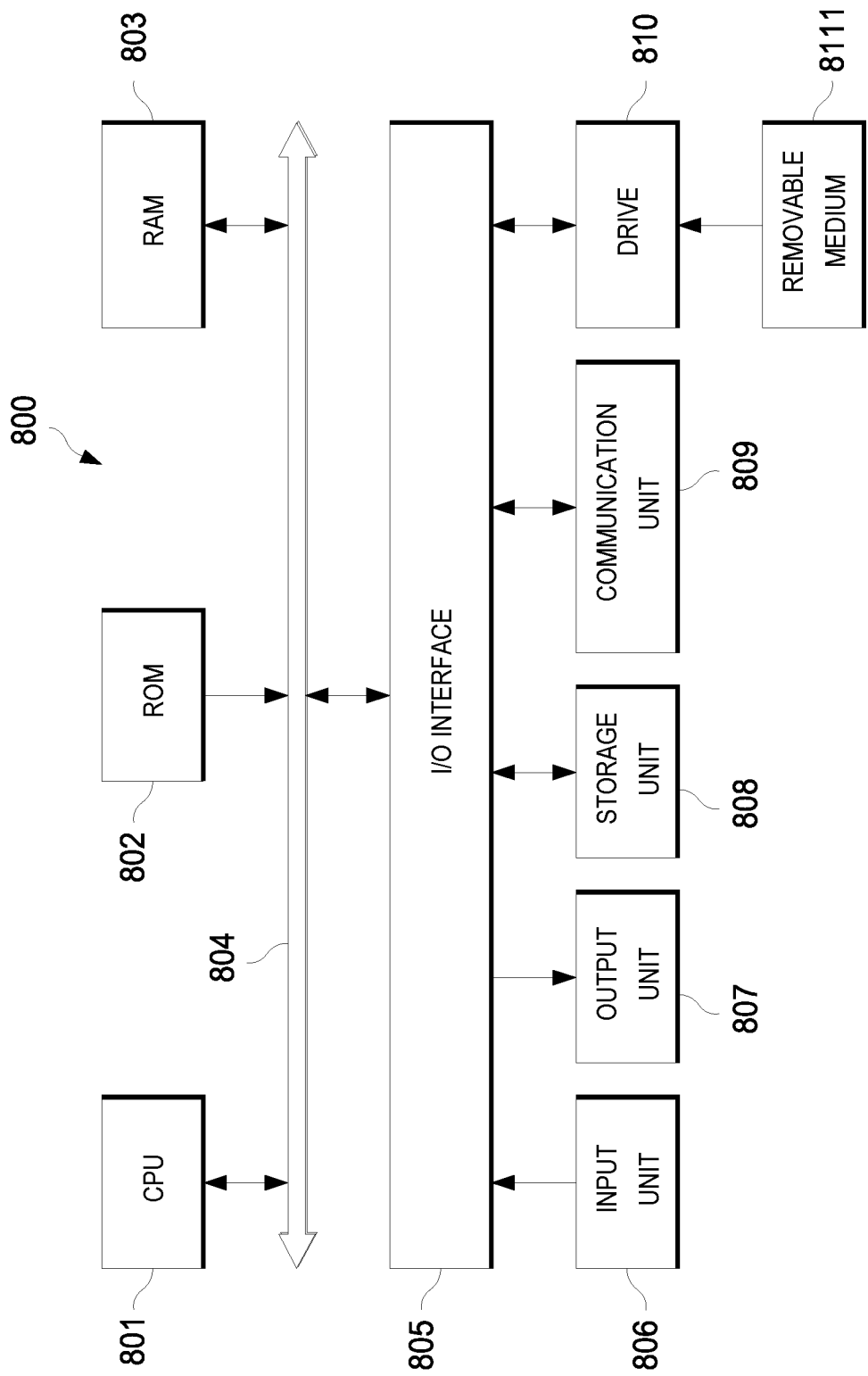
FIG. 8 shows a block diagram of an example system suitable for implementing example embodiments described in reference to FIGS. 1-7.

FIG. 8 shows a block diagram of an example system 800 suitable for implementing example embodiments described in reference to FIGS. 1-7. System 800 includes a central processing unit (CPU) 801 which is capable of performing various processes in accordance with a program stored in, for example, a read only memory (ROM) 802 or a program loaded from, for example, a storage unit 808 to a random access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some embodiments, the input unit 806 includes one or more microphones in different positions (depending on the host device) enabling capture of audio signals in various formats (e.g., mono, stereo, spatial, immersive, and other suitable formats).

In some embodiments, the output unit 807 include systems with various number of speakers. The output unit 807 can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific embodiment details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A method comprising:
solving, with at least one processor, a first optimization problem on time series data related to energy system planning, the first optimization including applying a power balancing framework to the time series data that captures intra-hour variability, wherein the power balancing framework reduces intra-hour variability to a single intra-hour time step to decouple a power balance time scale from an energy balance time scale and to allow optimization of energy technology and sizing using a lower-resolution timescale than used for intra-hour variability; and
selecting, with the at least one processor, technology assets and sizing for the energy system based on an average hourly and sub-hourly datasets.

2. The method of claim 1, wherein the average hourly data is obtained by down-sampling the time series data.

3. The method of claim 1, wherein the first optimization generates energy technology capacity numbers.

4. The method of claim 1, further comprising:
solving, with the at least one processor, a dispatch optimization problem on the original time series data; and
outputting, with the at least one processor, the energy technology selection and sizing and a dispatch.

5. The method of claim 1, wherein the first and dispatch optimization problems are solved using mixed integer optimization methods.

6. The method of claim 5, wherein the mixed integer optimization methods solve energy technology sizing and dispatch by considering an objective function, energy balance and constraints.

7. The method of claim 6, wherein the constraints include available photovoltaic space, cost constraints and technology constraints.

8. The method of claim 6, wherein the energy balance is violated when an energy transfer failed to occur between timesteps in the down-sampled time series data.

9. The method of claim 1, wherein the first dispatch optimization problems are solved using simulation.

10. The method of claim 1, wherein the power balancing framework includes the following power balancing equations:

$$\sum_{T \in DER} B^e_{m,d,h,T} \geq \max_{j \in \tau} L_{m,d,h,j},$$

where the power balance $B_{m,d,h,T}^e$ is greater than or equal to a maximum power demand ($L_{m,d,h,j}$), where m is month, d is day, h is hour, T is the set of technologies producing power, j is an index for sub-hourly time steps and $\tau$ is the set of sub-hourly timesteps.

11. A system comprising:
at least one processor;
memory storing instructions that when executed by the at least one processor causes the at least one processor to perform operations comprising:
solving a first optimization problem on time series data related to energy system planning, the first optimization including applying a power balancing framework to the time series data that captures intra-hour variability solving, with at least one processor, a first optimization problem on time series data related to energy system planning, the first optimization including applying a power balancing framework to the time series data that captures intra-hour variability, wherein the power balancing framework reduces intra-hour variability to a single intra-hour time step to decouple a power balance time scale from an energy balance time scale; and selecting, with the at least one processor, technology assets and sizing for the energy system based on an average hourly and sub-hourly datasets; and selecting technology assets and sizing for the energy system based on an average hourly and sub-hourly datasets.

12. The system of claim 11, wherein the average hourly data is obtained by down-sampling the time series data.

13. The system of claim 11, wherein the first optimization generates energy technology capacity numbers.

14. The system of claim 11, further comprising:

solving, with the at least one processor, a dispatch optimization problem on the original time series data; and outputting, with the at least one processor, the energy technology selection and sizing and a dispatch.

15. The system of claim 11, wherein the first and dispatch optimization problems are solved using mixed integer optimization methods.

16. The system of claim 15, wherein the mixed integer optimization methods solve energy technology sizing and dispatch by considering an objective function, energy balance and constraints.

17. The system of claim 16, wherein the constraints include available photovoltaic space, cost constraints and technology constraints.

18. The system of claim 16, wherein the energy balance is violated when an energy transfer failed to occur between timesteps in the down-sampled time series data.

19. The system of claim 11, wherein the first dispatch optimization problems are solved using simulation.

20. The system of claim 11, wherein the power balancing framework includes the following power balancing equations:

$$\sum_{T \in DER} B^e_{m,d,h,T} \geq \max_{j \in \tau} L_{m,d,h,j},$$

where the power balance $B^e_{m,d,h,T}$ is greater than or equal to a maximum power demand ($L_{m,d,h,j}$), where m is month, d is day, h is hour, T is the set of technologies producing power, j is an index for sub-hourly time steps and $\tau$ is the set of sub-hourly timesteps.

* * * * *